United States Patent
Farineau et al.

(10) Patent No.: US 7,515,547 B2
(45) Date of Patent: Apr. 7, 2009

(54) MANAGEMENT OF RESOURCE IN A POINT-TO-MULTIPOINT- OR MULTIPOINT-TO-MULTIPOINT-TYPE COMMUNICATION NETWORK, USING TWO ALLOCATION LEVELS

(75) Inventors: Jean Farineau, Levallois Perret (FR); Emmanuelle Chevallier, Orgeval (FR); Jean-Noël Lignon, Frouzins (FR); Xavier Denis, Colomiers (FR)

(73) Assignee: Alcatel, Paris (FR)

( * ) Notice: Subject to any disclaimer, the term of this patent is extended or adjusted under 35 U.S.C. 154(b) by 596 days.

(21) Appl. No.: 10/556,405

(22) PCT Filed: May 6, 2004

(86) PCT No.: PCT/FR2004/001104

§ 371 (c)(1),
(2), (4) Date: Nov. 10, 2005

(87) PCT Pub. No.: WO2004/102998

PCT Pub. Date: Nov. 25, 2004

(65) Prior Publication Data

US 2006/0221909 A1    Oct. 5, 2006

(30) Foreign Application Priority Data

May 13, 2003    (FR)    .................... 03 05722

(51) Int. Cl.
*H04L 12/28* (2006.01)
*H04J 3/16* (2006.01)

(52) U.S. Cl. .................. 370/252; 370/319; 370/465

(58) Field of Classification Search .................. 370/252, 370/316, 319, 465
See application file for complete search history.

(56) References Cited

U.S. PATENT DOCUMENTS

| | | | | |
|---|---|---|---|---|
| 5,363,374 | A * | 11/1994 | Zein Al Abedeen et al. | 370/233 |
| 5,608,727 | A | 3/1997 | Chen | |
| 5,978,363 | A * | 11/1999 | Dimitrijevic et al. | 370/319 |
| 6,070,052 | A * | 5/2000 | Ogasawara et al. | 455/13.1 |
| 6,212,389 | B1 | 4/2001 | Fapojuwo | |
| 6,366,761 | B1 * | 4/2002 | Montpetit | 455/12.1 |
| 6,381,250 | B1 | 4/2002 | Megel | |
| 6,522,635 | B1 * | 2/2003 | Bedwell | 370/314 |
| 2002/0009052 | A1 * | 1/2002 | Baudoin et al. | 370/232 |
| 2002/0133589 | A1 | 9/2002 | Ekambaram | |
| 2004/0203743 | A1 * | 10/2004 | Macridis et al. | 455/427 |

* cited by examiner

*Primary Examiner*—Andrew Lee
(74) *Attorney, Agent, or Firm*—Harness, Dickey & Pierce

(57) ABSTRACT

A point-to-multipoint or multipoint-to-multipoint communications network includes remote traffic stations connected to a management center (CG) by radio links sharing resources. The management center (CG) includes a management module for determining a primary distribution of the resources, including assignment margins, between the radio links that it manages and previously set up between the traffic stations, as a function of first information data representing rates of occupancy per traffic type of the resources previously assigned to the radio links. Each traffic station can then determine a secondary distribution between its traffic types of the resources assigned to its radio link as a result of the primary distribution, taking account of its own rates of occupancy per traffic type.

42 Claims, 5 Drawing Sheets

Fixed format compressed frame

Variable format compressed Ethernet frame

MANAGEMENT OF RESOURCE IN A POINT-TO-MULTIPOINT- OR MULTIPOINT-TO-MULTIPOINT-TYPE COMMUNICATION NETWORK, USING TWO ALLOCATION LEVELS

The invention relates to point-to-multipoint or multipoint-to-multipoint communications networks in which radio links that share resources are defined, and it relates more particularly to managing the assignment of resources of radio links in such networks.

In the present context, the expression "point-to-multipoint or multipoint-to-multipoint communications network" refers to satellite communications networks and terrestrial radio communications networks, with or without satellite extension over a portion of their links.

These communications networks generally include a plurality of traffic stations each of which manages locally the calls of users who are in its radio coverage area and each of which is connected by a radio link, for example via a relay satellite, to a traffic management center that is itself connected to a core network.

For example, in a GSM cellular telephone network with satellite extension, each traffic station includes a base transceiver station (BTS) that manages a radio cell in which user terminals can set up mobile calls and the traffic management center comprises a base station controller (BSC) that is primarily responsible for managing the resources of the satellite links of the various base transceiver stations connected to it and their operation and maintenance functions. The management center and the traffic stations connected to it constitute a base station subsystem (BSS). The base station controller is generally connected to a public cable network, such as a public land mobile network (PLMN), for example via a mobile switching center (MSC).

The traffic management center sets up calls between users of remote traffic stations. To be more precise, the traffic management center dynamically assigns satellite resources that consist either of transmission frequencies (in a single channel per carrier (SCPC) operating mode) or of time slots of a time frame (in a time division multiple access (TDMA) operating mode), as a function of the respective requirements of the various traffic stations that it manages. In other words, the management center distributes the resources (or transmission channels) of the satellite between the satellite links that it manages.

This distribution can be optimized using the demand assignment multiple access (DAMA) technique, for example, which distributes channels between the satellite links as a function of the data rate at which they can send, in other words as a function of the number of (active) channels used by each link to send frames.

This technique gives good results, in particular if the traffic of the various traffic stations does not vary too quickly. However, it is no longer the optimum if the traffic varies very quickly, which is frequently the case at peak times. The delay between the occurrence of traffic variations at one or more traffic stations and the implementation of a new distribution of resources to deal with those variations is typically of the order of one second. Consequently, when a new distribution is applied, it frequently happens that the traffic has again varied significantly at one or more traffic stations, so that this new distribution proves unsuitable.

Traffic variability generally depends on the traffic type (compression signaling traffic, network signaling traffic, voice traffic or data traffic), but this is not taken into account in determining the distribution.

Thus an object of the invention is to improve upon the above situation.

To this end the invention proposes a method of managing resources in a point-to-multipoint or multipoint-to-multipoint communications network in which radio links sharing resources have been defined.

The method consists in determining, firstly, for each traffic station first information data representing rates of occupancy per traffic type of the resources previously assigned to its radio link, secondly, as a function at least of the rates of occupancy per traffic type a primary distribution of the resources between the radio links including assignment margins, and, thirdly, for each traffic station a secondary distribution between traffic types of the resources assigned to its radio link as a result of the primary distribution, taking account of its rates of occupancy per traffic type.

The invention also proposes a traffic management center for a point-to-multipoint or multipoint-to-multipoint communications network in which radio links sharing resources have been defined.

The management center includes management means for determining a primary distribution of the resources including assignment margins. This primary distribution is determined at least as a function of first information data representing rates of occupancy per traffic type of resources previously assigned to the radio links so that each traffic station is able to determine a secondary distribution between traffic types of resources assigned to its radio link as a result of the primary distribution, taking account of its own rates of occupancy per traffic type.

The management center of the invention can have additional features and in particular, separately or in combination:

compression and decompression means connected to the management means for compressing frames to be sent to the remote traffic stations via the radio links and decompressing compressed frames coming from the remote traffic stations via the radio links, management means that determine the primary distribution from the first information data and from second information data representing the assignment requirements of the traffic stations, compression and decompression means that determine the first information data from information contained in the received compressed frames. However, the first information data may instead be contained directly in the received compressed frames (in which case the data is determined by the traffic stations), compression and decompression means that extract the second information data from transmitted frames. To reach the management center second information data can be integrated either into dedicated frames and sent via a dedicated signaling channel of the corresponding radio link or into the traffic frames transmitted, for example in the form of additional information, traffic types selected from a group including compression signaling traffic, network signaling traffic, voice traffic and data traffic, management means, responsible for forward traffic, comprising secondary distribution means that determine the secondary distribution as a function of defined levels of relative priority of the traffic types. In this case, in the event of saturation of resources on their radio link assigned to voice traffic, the secondary distribution means preferably assign to voice traffic resources previously assigned to data traffic, the compression and decompression means then storing the data of the data traffic of this radio link in a first buffer during the period of saturation and deleting the stored data if the period exceeds a selected threshold. Moreover, in the event of persistence of voice traffic saturation, the secondary distribution means authorize calls in progress to continue and prohibit the initialization of new calls on the link concerned. If this is still insufficient, the secondary distribution means assign temporarily to the voice traffic of a radio link resources reserved for "silence mode" (or "idle") traffic of that link and continue to prohibit the initialization of new calls on the link concerned.

management means that determine the primary distribution from a static traffic evolution model, management means comprising primary distribution means that, firstly, store the rates of occupancy per traffic type determined for each traffic station, secondly, determine, preferably by extrapolation, for each traffic station the resources it requires for each of its traffic types as a function of its determined rates of occupancy per traffic type, thirdly, determine assignment margins for the extrapolated resources associated with each traffic type as a function of stored traffic evolution data specific to each traffic station and the determined rates of occupancy of all the traffic stations, and, fourthly, add the determined assignment margins to the extrapolated resources to provide the primary distribution. In this case the primary distribution means preferably determine traffic evolution data representing the difference between the extrapolated resources previously determined, excluding the margin, and the resources actually being used, obtained from the rates of occupancy that have just been determined. The primary distribution means then generate from the traffic evolution data histograms representing the temporal variation of each traffic type for each radio link, then determine from each histogram a blocking rate for each radio link, a function of the assignment margin allocated, then determine for each radio link a blocking rate for each rate of occupancy determined for each type of traffic and for each margin value starting from a null value, in order to determine the number of margin channels to be assigned to each radio link taking account of its (current) determined rates of occupancy, and finally carry out a sort by increasing blocking level, with all radio links lumped together, to guarantee the lowest blocking rate for each of the radio links taking account of the total available assignment margin, management means that establish the primary distribution periodically and secondary distribution means that establish the secondary distribution periodically after a primary distribution has been established, management means that establish the primary distribution for traffic to be sent (forward traffic) and for traffic to be received (return traffic).

The invention also relates to a traffic station for a point-to-multipoint or multipoint-to-multipoint communications network in which radio links sharing resources are defined, said traffic station comprising secondary distribution means that determine as a function at least of its rates of occupancy per traffic type a secondary distribution between its traffic types of resources assigned to its radio link by a traffic management center of the above type.

The traffic station of the invention can have additional features and in particular, separately or in combination:

compression and decompression means connected to its secondary distribution means to compress frames to be sent to the management center via its radio link and to decompress compressed frames coming from the management center via its radio link, control means for determining first information data representing rates of occupancy per traffic type of resources previously assigned to its radio link by the management center and for instructing the sending of the first information data to the traffic management center via its radio link, control means that determine second information data representing its resource assignment requirements as a function of the traffic to be sent to the management center via the radio link and instruct the sending thereof to the traffic management center via said radio link with a view to determining the primary distribution. The station can then send the second information data either via a dedicated signaling channel of its radio link or integrated into frames sent to the traffic management center. Moreover, the control means can then determine second information data in the form of binary indicators representing saturation states, secondary distribution means that can determine the secondary distribution as a function of defined relative priority levels of the various traffic types. In this case, in the event of saturation of the resources assigned to voice traffic, the secondary distribution means preferably assign voice traffic resources previously assigned to data traffic and then instruct the compression and decompression means to store in a first buffer the data of the data traffic for the period of saturation and to delete the stored data if the period exceeds a selected threshold. Moreover, in the event of persistence of voice traffic saturation, the secondary distribution means authorize calls in progress to continue and prohibit the initialization of new calls on their link. Also, in the event of further persistence of voice traffic saturation, the secondary distribution means temporarily assign voice traffic resources reserved for "silence mode" (or "idle") traffic and continue to prohibit the initialization of new calls on their link, secondary distribution means that establish the secondary distribution periodically, following the establishing of a primary distribution by the management center.

The invention has a particularly beneficial, although not exclusive, application in any point-to-multipoint or multipoint-to-multipoint communications network, such as a satellite communications network, a terrestrial radio communications network, for example an E1 or T1 network and the like, or an Ethernet, IP, Frame Relay or ATM network, and a terrestrial radio communications network using satellite extension over a portion of its links, for example a TDMA or CDMA cellular network.

Other features and advantages of the invention become apparent upon reading the following detailed description and examining the appended drawings, in which.

The appended drawings constitute part of the description of the invention and may contribute to the definition of the invention, if necessary.

The invention relates to a point-to-multipoint or multi-point-to-multipoint communications network in which radio links sharing resources are defined.

The communications network described hereinafter is a cellular telephone network with satellite extension, for example a GSM (or 2G) network, but the invention is not limited to that type of network. As indicated above, it concerns any point-to-multipoint or multipoint-to-multipoint communications network, such as a satellite communications network, a terrestrial radio communications network, for example an E1 or T1 network and the like, or an Ethernet, IP, Frame Relay or ATM network, and a terrestrial radio communications network using satellite extension over a portion of its links, for example a TDMA or CDMA cellular network.

The following description relates to an embodiment of the invention operative at the level of the BSC-BTS interface of the GSM network. The invention is not limited to that type of interface alone, however. It concerns any other interface of the network and may apply to sharing transmission resources between two or more types of interface of the same network.

Figure 1:
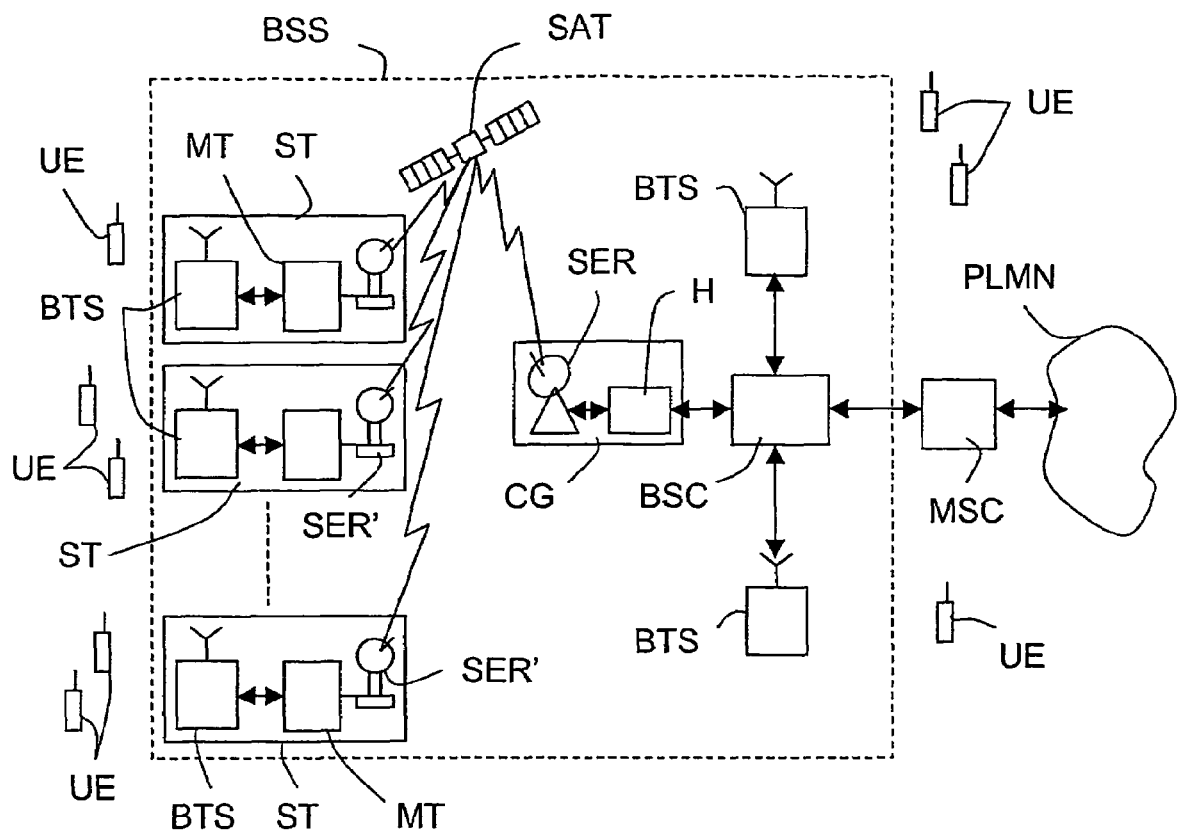
FIG. 1 is a diagram of a portion of a communications network of the invention with satellite extension.

The application of the invention referred to above is described first and by way of non-limiting example with reference to FIG. 1.

A GSM communications network with satellite extension of the type shown in FIG. 1 may be defined very broadly, but nevertheless in sufficient detail for the invention to be understood, as a conventional radio subsystem known as the base station subsystem BSS connected to a core network, here taking the form of a public cable network, such as a public land mobile network PLMN.

In the present example the BSS and the PLMN are connected by a mobile switching center MSC.

The BSS includes one or more traffic management centers CG each taking the form, for example, of a hub H connected to a transceiver station SER providing satellite links Li with a communications relay satellite SAT.

It is important to note that the management center CG and the hub H (which is the center for communication with the remote traffic stations STi) may be dissociated from each other and/or at a distance from each other.

The BSS also includes one or more base station controllers BSC connected to the traffic management center CG, to be more precise to its hub H, and to the mobile switching center MSC. As indicated above, the BSC is primarily responsible for managing the resources of the satellite links of the base transceiver stations BTS that are connected to it and their operating and maintenance functions.

The BSC and the BTS are connected via an A-bis interface, which is a synchronous interface using G.704 framing (thus the frames are E1 frames which (or portions whereof) contain payload data).

In the TDMA transmission mode, each frame is divided into a fixed number of time slots each containing one byte. This number is equal to 32 in the case of E1 frames, in conformance with the G.703/G.704 recommendations of the ITU-T. The frame frequency is generally 8 kHz, carrying thirty-one 64 kbit/s channels at the rate of one channel per time slot.

At the A-bis interface, each byte is divided either into four "nibbles" (pairs of bits) each carrying one 16 kbit/s channel or into eight half-rate compressed voice channels (in which case each bit corresponds to one voice channel). Alternatively, a byte need not be divided, especially in the case of data transmission in GSM/GPRS networks (in which case the data channels are 64 kbit/s channels) or in the case of the transmission of signaling.

The BSC and the MSC may be connected by a transcoder/rate adapter unit TRAU for converting 3 kbit/s compressed voice data into 64 kbit/s digitized voice data to make the voice channels compatible with the mobile switching center MSC. In this case, the MSC and the TRAU are connected via an interface known as the A interface and the BSC and the TRAU are connected via an interface known as the A-ter interface.

To provide coverage of a large territory, the mobile switching center MSC can be connected to a plurality of base station controllers BSC via a plurality of A-ter interfaces.

The mobile switching center MSC performs all the operations necessary for managing calls of the user terminals (also known as user equipments) UE.

Finally, the base station subsystem BSS comprises a plurality of traffic stations ST each associated with one or more coverage areas in which user terminals UE can set up calls. Each traffic station ST takes the form of a base transceiver station BTS defining its coverage area(s) and connected to a resource assignment module MT in turn connected to a transceiver station SER' providing the satellite link Li with the satellite SAT.

As shown in FIG. 1, the base station controller BSC can also be connected directly to the base transceiver stations BTS via A-bis interfaces independently of the satellite links.

The traffic management center CG of the invention in particular manages the resources of the satellite SAT and more precisely distributes those resources between the links established between the transceiver station SER and the remote traffic stations ST.

Figure 2:
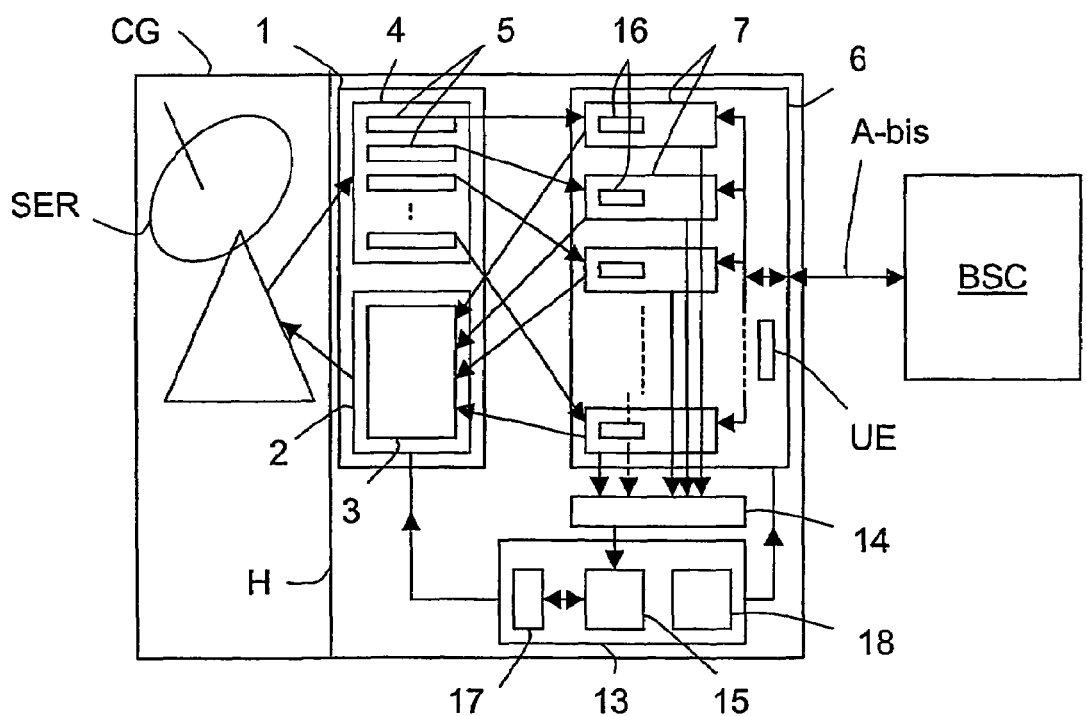
FIG. 2 is a diagram of a first embodiment of a management center of the invention.

In the example shown in FIG. 2, satellite links Li link the hub H to remote sites (or traffic stations) STi at the rate of one satellite link Li per remote site STi. These links Li use a shared resource (carrier Lf) in Forward mode (i.e. from the hub H to the remote stations STi) and a set of shared carriers (Lr) for all the Return mode links (i.e. the links from the remote stations STi to the hub H).

In this traffic management center CG the hub H includes a modem 1 consisting of a set 2 of modulators 3 and a set 4 of demodulators 5.

To be more precise, in this embodiment, the set 2 of modulators includes one modulator 3 producing a modulated carrier used by all the remote sites STi. This modulator 3 modulates frames sent from the base station controller BSC to all the remote traffic stations STi at the carrier frequency Lf.

The set 4 of demodulators includes as many demodulators 5 as there are carriers Lr. Each demodulator 5 demodulates the carrier coming from remote traffic stations STi and thereby restores the frames sent to the base station controller BSC. For example, the modem 1 provides full-duplex sending and receiving of time slots, which corresponds to the TDMA transmission mode.

In the embodiment described, the frames exchanged are compressed to limit the traffic on the satellite links Li.

Consequently, the hub H includes compression and decompression (or expansion) means 6 connected to the modem 1 and including, in the present example, as many compressors/decompressors (or compressors/expanders) 7 as there are satellite links Li. To be more precise, each compressor/decompressor 7 is supplied with demodulated and compressed frames by one of the demodulators 5 and supplies one of the modulators 3 with compressed frames to be modulated.

The compressor portion of the compressor/decompressor 7 compresses the frames to be sent and adapts the format of the data blocks at the interface with the modem 1, which is of the Ethernet, IP or ATM type. The decompressor portion of the compressor/decompressor 7 adapts to the interface with the modem 1, which is generally of the same type as that of the compressor portion, and, by decompression, restores the initial frames (i.e. the frames as they were prior to being compressed in the traffic station ST).

The compression may be effected in various ways. However, it is advantageous to use the method described in the Applicant's patent document WO 03/019834, the whole of the technical content of which is incorporated herein by reference. That compression method is not described here because it is not the subject matter of the invention. Suffice to say that it relies on analyzing the temporal evolution of the respective contents of each data channel. A channel is "passive" if it is unchanged relative to one or more of the preceding assignment cycles, whereas a channel is "active" if one or more of the bits that it is carrying has changed relative to one or more of the preceding assignment cycles. Only active channels are transmitted in full, inactive channels being compressed, i.e. eliminated.

Figure 3:
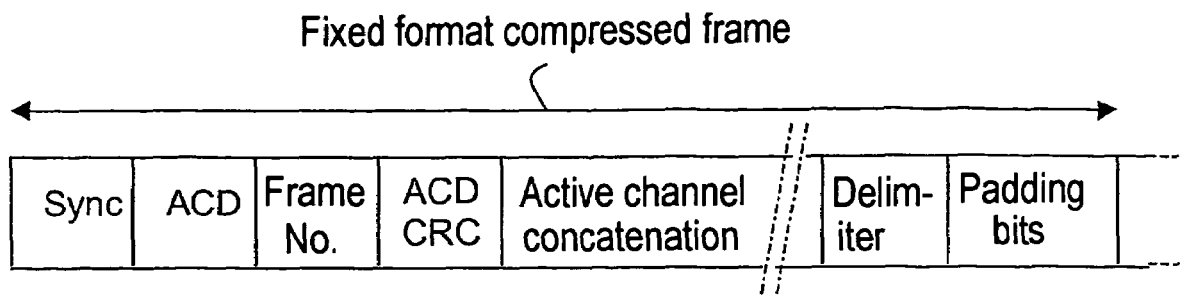
FIG. 3 is a diagram of an example of a standard fixed format compressed frame.

FIG. 3 shows the typical structure of a standard prior art compressed frame to be transmitted over the air interface via the satellite SAT.

The first field (Sync) is reserved for synchronizing frame transmission, in particular in the destination equipment. The second field (ACD) is an active channel descriptor that identifies the positions of the active channels within the frame to be reconstituted, but primarily guarantees synchronization of data decompression taking the frame into account in the event of loss of data blocks in the transmission system. The third frame (frame number) specifies the position of a frame in a stream. The fourth field (ACD CRC) is a dedicated field for making the header secure. The fifth field (active channels concatenation) includes all the active channels of the frame in a concatenated form. The sixth field is a delimiter that distinguishes the data of the fifth field from that of a seventh field. Finally, this seventh field (padding bits) maintains a constant (fixed) frame size.

One object of the invention is to enable the use of frames of variable size (and format) instead of using frames of fixed size that contain padding bits of no utility.

Figure 4:
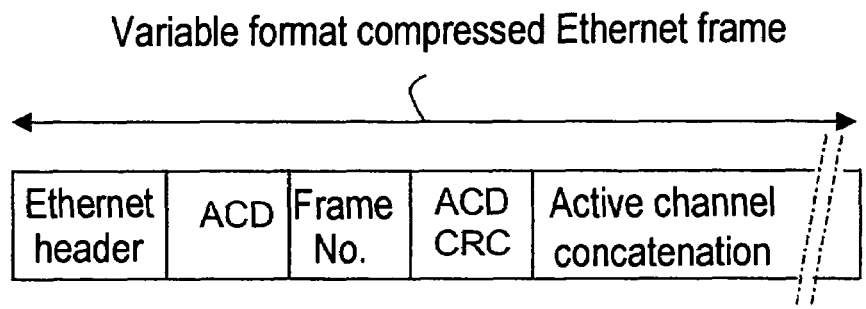
FIG. 4 is a diagram of an example of a variable format compressed frame usable in a network of the invention.

FIG. 4 shows an example of a variable format frame usable in a network of the invention.

This frame comprises a first field (Ethernet header, for example) replacing the SYNC field. The second (ACD), third (frame number), fourth (ACD CRC) and fifth (active channel concatenation) fields are substantially identical to the fields of the standard fixed size frame shown in FIG. 3. The number of active channels varying as a function of the link data rate, the size of the fifth and final frame (active channel concatenation) is therefore variable, like that of the frame that contains it.

Figure 5:
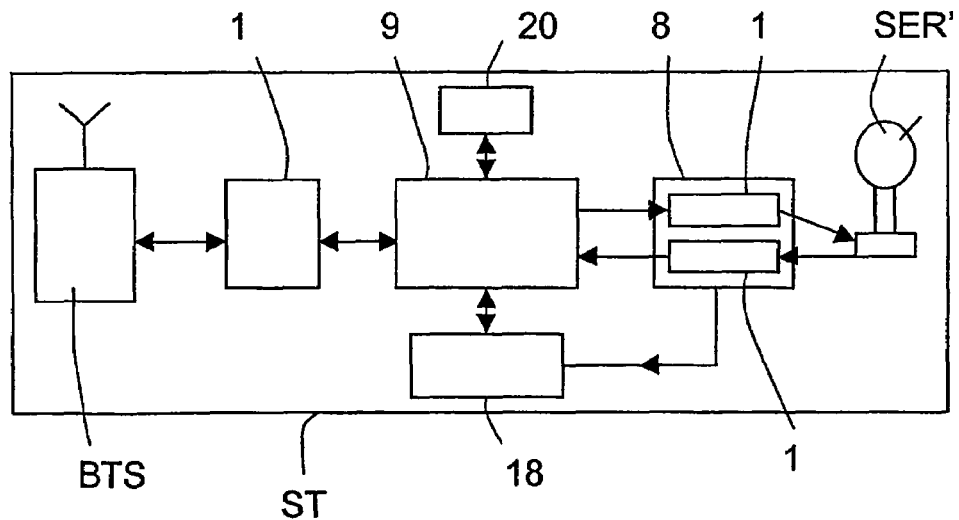
FIG. 5 is a diagram of a first embodiment of a traffic station of the invention.

To be able to send the management center CG compressed and modulated frames and to be able to demodulate and decompress frames sent by the management center CG, each traffic station STi comprises a modem 8 of the same type as said management center CG and a compressor/decompressor 9 of the same type as said management center CG (see FIG. 5). To be more precise, the modem 8 has a dedicated modulation portion 10 and a dedicated demodulation portion 11.

The modem 8 is connected to the transceiver station SER' and the compressor/decompressor 9 is connected to the base transceiver station BTS via a control module 12 (see below) and a G.703 interface.

In addition to the modem 1 and the compression and decompression means 6, which manage the variable format frames described above, the hub H comprises a management module 13 connected to the modem 1 and to the compression and decompression means 6, to be more precise to the compressors/decompressors 7 thereof, preferably via a mediation and concentration module 14.

The management module 13 determines a primary distribution of satellite resources, including assignment margins, between the satellite links Li that its management center CG manages, preferably periodically (or cyclically), at least as a function of first information data representing rates of occupancy per traffic type of the resources previously assigned to the satellite links, in order for each traffic station STi to be able to determine a secondary distribution between its traffic types of resources assigned to its link as a result of the primary distribution, taking account of its own rates of occupancy per traffic type.

The management module 13 preferably uses an assignment technique derived from the demand assignment multiple access (DAMA) technique. As indicated above, the conventional DAMA technique assigns a satellite link Li a number of channels that is a function of the data rate to be sent, in other words of the number of (active) channels used to send frames, independently of the type of traffic that said channels carry. This number of assigned channels includes an assignment margin that is generally equitably divided between the links. A detailed description of the DAMA dynamic assignment technique can be found in "Satellite Communication Systems", G. Maral and M. Bousquet, published by Wiley.

In the technique derived from the DAMA technique used by the invention, the management module 13 includes a resource assignment module 15 for determining a primary distribution of resources as a function of the rates of occupancy per traffic type supplied to it, via the mediation and concentration module 14, by the compressors/decompressors 7, and to be more precise, by a load evaluation module 16 included in each of them.

To be more precise, each load evaluation module 16 operates on decompressed frames generated by the decompression function. It determines first information data in each decompressed frame representing rates of occupancy per traffic type.

The traffic types include in particular compression signaling traffic, network (here GSM) signaling traffic, voice traffic and data traffic.

The first information data is either contained in the frames received (in which case it has been determined beforehand by the traffic stations STi) or determined from the content of the frames received.

It may be determined from information contained in the decompressed frames by comparing the number of channels used for a given type of traffic and the number of channels previously assigned by the management module 13. Of course, in this case, the resource assignment module 15 supplies the load evaluation modules 16 with each primary distribution that it determines in order to allow each load evaluation module 16 to deduce the loading of a link in relation to the capacity actually assigned to that link.

The first information data coming from the traffic stations STi is preferably determined directly by their control module 12 from streams of any type that they receive from their base transceiver station BTS and that are to be sent to the management center CG. This solution is preferred because it is more accurate that the preceding solution.

In either case, the load evaluation module 16 sends the resource assignment module 15 the rates of occupancy per traffic type for each satellite link Li during each assignment cycle (or period). Remember that, for a system using DAMA, the duration of an assignment cycle is of the order of 500 ms to a few seconds.

To determine the primary distribution, the resource assignment module 15 preferably stores all the rates of occupancy per traffic type and per link Li which it receives from the detection modules 16. It then determines, preferably by extrapolation, the resources, excluding assignment margins, that each traffic station STi (or link Li) requires for each of its traffic types, given the rates of occupancy per traffic type which have just been determined.

This extrapolation may also take into account the extrapolated capacity requirements of the traffic stations STi. Because of the delay between measuring the capacity used and assigning capacity, the stream applied to the input of the traffic station STi by the associated base transceiver station BTS may necessitate a number of channels greater than the maximum number authorized by the management center CG. The extrapolation process introduces a margin intended to reduce the risk of congestion associated with this delay between measuring and actually assigning capacity.

This situation of congestion (or saturation) cannot be signaled by the rates of occupancy alone. The traffic stations STi therefore preferably determine second information data representing their assignment requirements.

This second information data is preferably determined by the control module 12, which receives from the base transceiver station BTS any type of stream to be sent to the management center CG.

The second information data is sent by the traffic stations STi either in dedicated signaling frames, which can use a dedicated signaling channel of their satellite link Li, or in compressed and modulated traffic frames, in the form of additional information. To limit the overhead resulting from the presence of the second information data, it may take the form either of binary flags or of a few bits reporting a state of congestion (or saturation).

In this case, the detection modules 16 of the compressors/decompressors 7 of the management center CG extract the second information data from the traffic frames or from dedicated frames and send it to the resource assignment module 15 during each assignment cycle (or period) and in corresponding relationship to the satellite link Li from which it has come.

At the time of each assignment cycle, the resource assignment module 15 therefore receives first information data (the rate of occupancy per link that has been determined), and where applicable second information data (requirements per traffic type), and determines assignment margins from this received data and traffic evolution data characterizing each link Li (or each traffic station STi).

The traffic evolution data is preferably stored in a first memory 17 of the management module 13.

This traffic evolution data may represent a static (or analytic) traffic evolution model, which may where applicable be renewed regularly. However, it is preferable for the traffic evolution data to represent a dynamic traffic evolution model.

In the later case, the resource assignment module 15 preferably determines traffic evolution data representing the difference between the extrapolated resources previously determined, ignoring the margin, and the resources actually used, obtained from the rates of occupancy that have just been determined.

In this case, the resource assignment module 15 generates from the traffic evolution data histograms representing counted differences between the resources determined by extrapolation, ignoring the margin, and the resources actually used, obtained from the rates of temporal variation of each type of traffic for each link. These histograms are updated on each cycle in order to take as much account as possible of the temporal evolution of each traffic type on each link.

Figure 6:
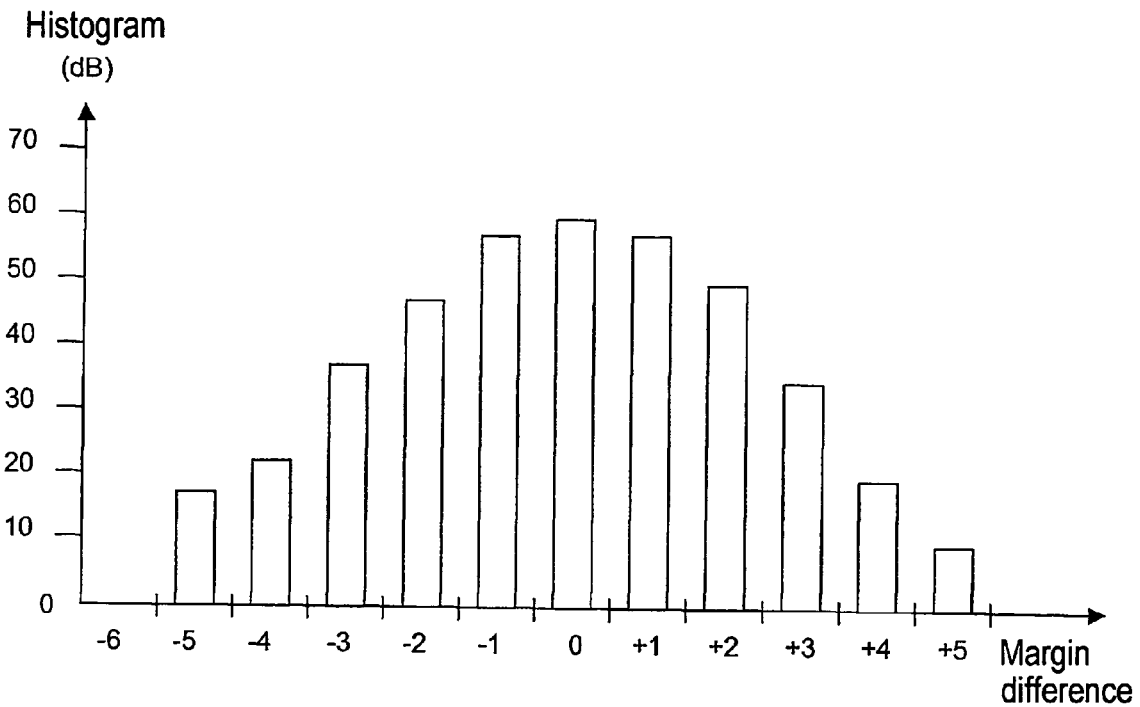
FIG. 6 is a diagram of an example of a histogram of the difference between the number of channels used and the number of channels initially assigned.

FIG. 6 shows an example of a histogram generated by the resource assignment module 15. This is a normalized histogram for one traffic type and for one satellite link Li, expressed in dB, as a function of the difference between the number of channels used and the number of channels initially assigned, a channel in this embodiment representing a unit capacity of 8 kbit/s.

Thus the characteristics of each traffic can be defined in terms of load rate, rate of alternation between communicating parties, speaking time between communicating parties, and more generally any parameter liable to influence the determination of an assignment margin.

Figure 7:
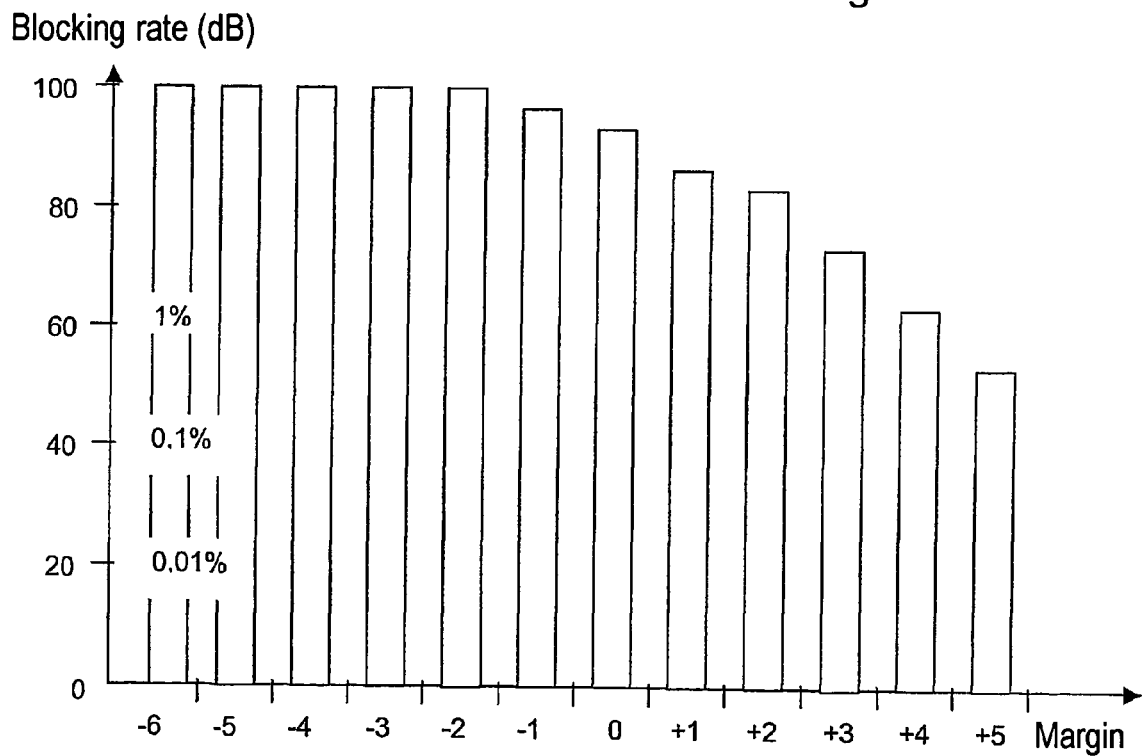
FIG. 7 is a diagram of an example of blocking rate variation as a function of assignment margin.

On the basis of each histogram, the resource assignment module 15 determines the blocking rate per link as a function of the assignment margin that has been determined. FIG. 7 shows an example of the evolution of the blocking rate. Note that a margin of four channels guarantees a blocking rate of about 2%.

The resource assignment module 15 then tabulates for each satellite link Li the blocking rate for each rate of occupancy (or current traffic load value) that has been determined, for each traffic type and for each margin value starting from a null value. It then uses these tables to determine the number of margin channels to assign to each satellite link Li per traffic type as a function of its current load (the rates of occupancy that have been determined). To this end, the resource assignment module 15 takes the value of the capacity required (in terms of channels) on each assignment cycle for each satellite link Li and for each traffic type. It then performs a sort in order of increasing blocking rate, lumping all links together. The margin for each link is then assigned, aiming for the lowest possible blocking rate, starting from the link having the lowest blocking rate and given the total available assignment margin. The margins are distributed per traffic type, the total margin assigned to a satellite link Li therefore being equal to the sum of the margins assigned to each of its traffic types.

For example, the following table can be obtained for one traffic type:

| Link | Blocking rate | Margin assigned | Cumulative margin |
| --- | --- | --- | --- |
| 5 | 0.00010% | 5 | 25 |
| 6 | 0.00015% | 4 | 24 |
| 3 | 0.00027% | 4 | 23 |
| 2 | 0.00048% | 3 | 22 |
| 4 | 0.00079% | 5 | 21 |
| 1 | 0.00095% | 4 | 20 |
| 5 | 0.0010% | 4 | 19 |
| 6 | 0.0015% | 3 | 18 |
| 3 | 0.0027% | 3 | 17 |
| 2 | 0.0048% | 2 | 16 |
| 4 | 0.0079% | 4 | 15 |
| 1 | 0.0095% | 3 | 14 |
| 5 | 0.010% | 3 | 13 |
| 6 | 0.015% | 2 | 12 |
| 3 | 0.027% | 2 | 11 |
| 2 | 0.048% | 1 | 10 |

In the present example, if the total margin that can be assigned for the traffic type concerned is 27 channels, the resource assignment module 15 assigns three margin channels to link 3, two margin channels to link 2, four margin channels to link 4, three margin channels to link 1, three margin channels to link 5, and two margin channels to link 6.

This guarantees a theoretical blocking rate of better than 0.015% for each of the six satellite links Li, given that, with this distribution, the least favored link statistically speaking is link 6, which benefits from a blocking rate evaluated a priori at only 0.015%. Conversely, the link that is most favored a priori is link 3, with an evaluated blocking rate of 0.0027%.

This margin assignment principle guarantees an optimized distribution of the margins of all of the links, taking account of the margin statistics and their current operating points.

The distribution of the margins constitutes an operating point that is updated on each cycle taking account of the first (and second) information data received. It is also possible to give priority to processing certain high-priority traffic, should this prove indispensable.

Thus statistical data can be used to optimize the distribution of the total margin. However, this also has the effect of reducing the total margin needed and consequently of reducing the capacities and operating expenses (OPEX) of the network.

Figure 8:
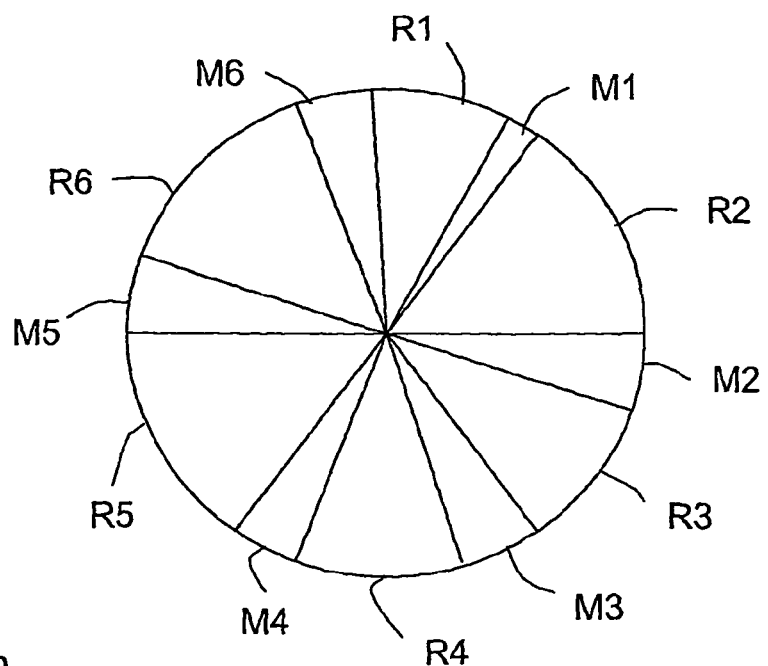
FIG. 8 is a diagram of an example of the distribution of resources between six satellite links.

The total margin Mi assigned to each satellite link Li is then added to the resources Ri that have previously been extrapolated for it. This gives the primary distribution of the assignment cycle. FIG. 8 is a diagram giving an example of the primary distribution of resources between six satellite links Li.

The total resources (Ri+Li) assigned to each traffic station STi are sent to the modem 1, which integrates them into a dedicated signaling frame that it sends over the corresponding satellite link Li.

On receiving this dedicated signaling frame, the traffic station STi forwards it to a distribution module 18 for determining the secondary distribution of the resources that have been assigned to it as a function of defined relative priority levels of the traffic types.

The distribution module 18 is preferably configured to assign the highest priority level to compression signaling traffic, the next lower level to network (GSM) signaling traffic, the next lower level to voice traffic, and the lowest level to data traffic.

Priority is therefore given to sending signaling. It is important to note that the resources assigned to a satellite link Li are determined so that saturation of the signaling data alone never occurs.

Voice traffic takes priority over data traffic because its temporal variability is much lower than that of data traffic. Because of this it does not require large margins.

Outside situations of saturation, which occur primarily at peak times, the distribution module 18 effects secondary distribution substantially equitably. On the other hand, if saturation occurs at the input of the compressor/decompressor 9 of a traffic station STi, the distribution module 18 is immediately advised of this and then determines the secondary distribution as a function of what is required.

For example, if there is a localized peak of signaling traffic to be routed, capacity is automatically reduced for other types of stream (or traffic), within the limits of the overall capacity assigned to the link concerned.

On the other hand, if saturation occurs in voice calls, which occurs frequently at peak times, the distribution module 18 assigns voice traffic the most resources, and in particular the resources previously assigned to data traffic. The data of the data traffic reaching the traffic station STi concerned is then preferably stored in a buffer 19 by the compressor/decompressor 9 (within the limit of a fixed storage capacity) in order to be sent afterwards (as soon as the saturation has terminated). This data is preferably stored in the buffer 19 for a time that cannot exceed a selected threshold. The data is deleted if this threshold time is exceeded. If voice traffic saturation continues, the distribution module 18 authorizes (voice) calls in progress to continue and prohibits the initialization of new (voice and data) calls on its satellite link Li. If this is still not sufficient, and if the traffic station STi is operating in the DTX transmission mode, the distribution module 18 temporarily assigns to voice traffic resources that were until then reserved for "silence mode" traffic. Of course, in this situation, it continues to prohibit the initialization of new (voice and data) calls over its satellite link Li. Moreover, as soon as the saturation terminates, the resources initially reserved for silence traffic are returned.

The distribution module 18 sends instructions defining the secondary distribution to the compressor 9 for it to adjust its output data rate to the capacity assigned to the link concerned. In one particular application of the invention, the compressor delivers in this case frames of the type shown in FIG. 4, the size of which depends on the data rate fixed for the output, the period between two frames remaining fixed regardless of the data rate. To be more precise, the resources that are assigned to the satellite link Li during the primary distribution of the preceding assignment cycle define a maximum number of usable channels (or time slots). Consequently, the size of the fifth (concatenation) field of compressed frames that the traffic station STi sends to its management center CG is limited by the maximum number of channels and the content of the channels is a function of the secondary distribution defined by the distribution module 18.

Moreover, there have been described in detail hereinabove primary and secondary distributions relating to the traffic that has to be sent to the management center CG by the remote traffic stations STi (known as "return traffic"). However, the invention is equally concerned with traffic that the management center CG must send to the traffic stations STi (known as "forward traffic"). This forward traffic comes from the GSM network via the base station controller BSC.

To this end, the hub H performs its own secondary distribution. To be more precise, its management module 13 comprises a distribution module 18 of the type installed in the traffic station STi. Moreover, the compression and decompression means 6 preferably include a buffer 20 for temporarily storing the data of data traffic in the event of saturation (or congestion), when so instructed by the distribution module 18.

The compression/decompression means 6 and the management module 13 preferably constitute a compressor implementing the DAMA management function.

Figure 9:
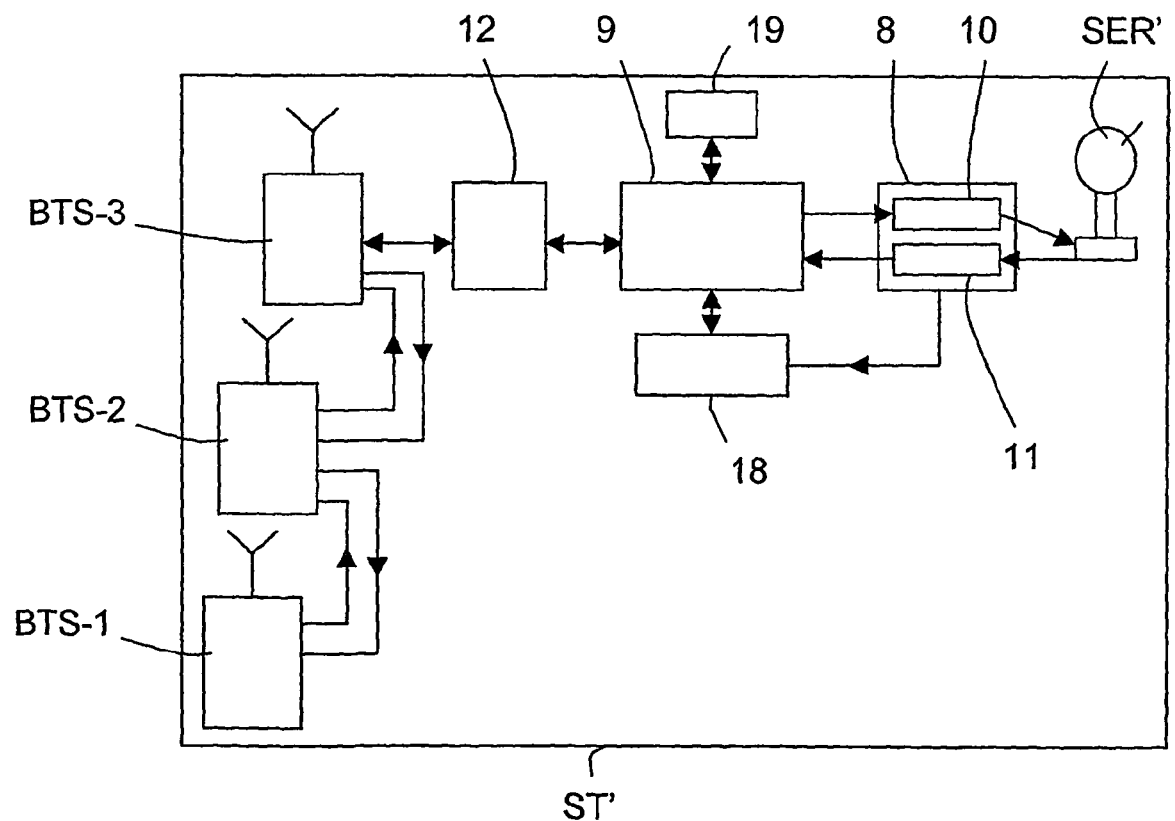
FIG. 9 is a diagram of a second embodiment of a traffic station of the invention.
Figure 10:
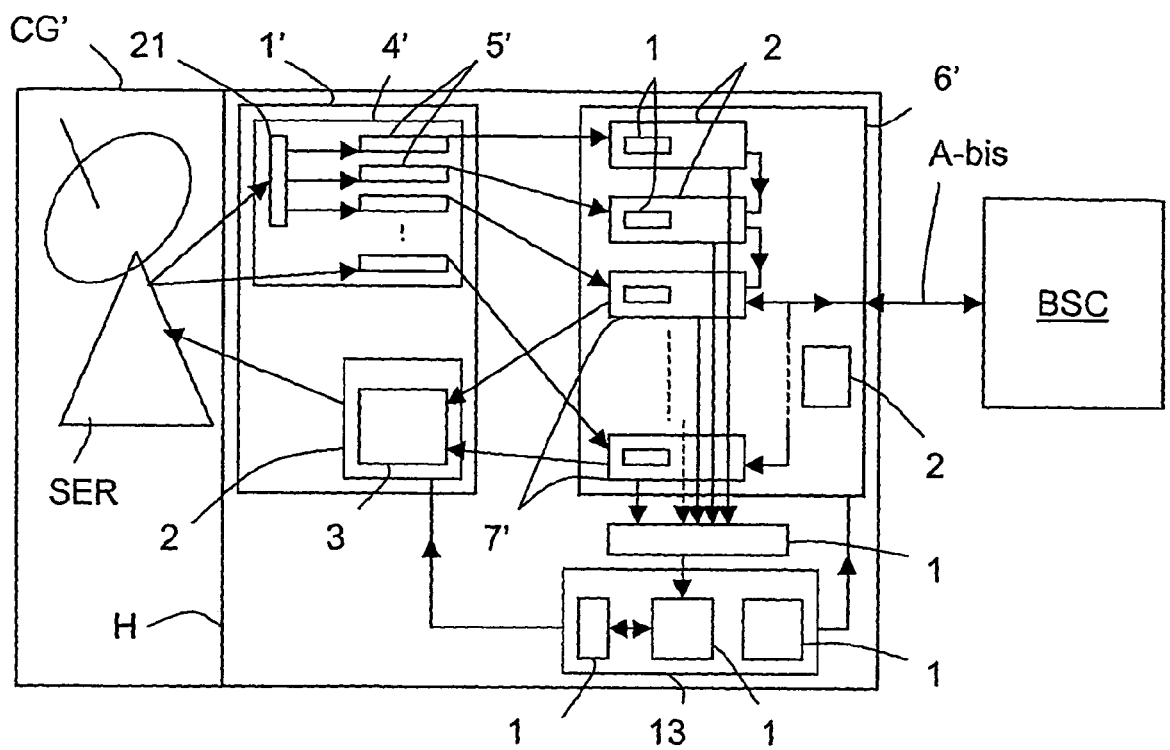
FIG. 10 is a diagram of a second embodiment of a management center of the invention.

FIGS. 9 and 10 show a variant of the management center CG' that cooperates with a variant of the traffic station ST' and two or more traffic stations ST of the type described above with reference to FIG. 5.

In this variant, the traffic station ST' shown in FIG. 9 defines a first site (S1) and includes three base transceiver stations BTS-1 to BTS-3 connected in pairs. The other two traffic stations ST each comprise only one base transceiver station BTS and define a second site (S2) and a third site (S3). These three sites share the 31 time slots of an E1 frame. For example, the first site S1 uses time slots 1 to 15, the second site S2 uses time slots 16 to 24 and the third site S3 uses time slots 25 to 31. In this case, the first base transceiver station BTS-1 supplies the traffic occupying time slots 1 to 5, the second base transceiver station BTS-2 supplies the traffic occupying time slots 6 to 10 and the third base transceiver station BTS-3 supplies the traffic occupying time slots 11 to 15. Consequently, the traffic coming from the first base transceiver station BTS-1 is sent to the second base transceiver station BTS-2 which concatenates it with its own traffic and sends the concatenated traffic to the third base transceiver station BTS-3 which concatenates its own traffic with the traffic that it receives and sends the two-fold concatenation to the compressor/decompressor 9 (via the control module 12).

The remainder of the operation of the traffic station ST' of the first site S1 is substantially identical to that of the traffic stations ST of the second site S2 and the third site S3.

The management center CG' shown in FIG. 10 has the same architecture as the management center CG described above with reference to FIG. 2. In fact, only its modem 1' and its compression and decompression means 6' differ from those (1 and 6) of the management center CG, in order to be able to process E1 frames coming from the three traffic stations ST' and ST of the sites S1 to S3.

Here, the set 4' of demodulators of the modem 1' comprises a distributor 21 for distributing to three demodulators 5' the carriers coming from the sites S1 to S3. In fact, the distributor 21 sends to a first demodulator 5' time slots 1 to 15 coming from the first site S1, to a second demodulator 5' time slots 16 to 24 coming from the second site S2 and to a third demodulator 5' time slots 25 to 31 coming from the third site S3. As shown here, the set 4' of demodulators may include other demodulators for demodulating E1 frames coming from other traffic stations ST. The outputs of the first two demodulators 5' feed two single compressors 22 of the compression and decompression means 6' and the outputs of the other demodulators feed compressors/decompressors 7 of the type used in the management center CG shown in FIG. 2. The output of the first decompressor 22 feeds an output stage of the second decompressor 22, the output whereof feeds decompressed frame portions from the demodulators 22 to an output stage of the first compressor/decompressor 7, the output whereof feeds the base station controller BSC. Like the compressors/decompressors 7, the two decompressors 22 are connected to the management module 13 in order to feed it with first (and second) information data, as in the previous embodiment shown in FIG. 2. Moreover, only the compressors/decompressors 7 are connected to the modulators 3 of the set 2 of modulators of the modem 1'.

All other aspects of the operation of the management center CG', and in particular of its hub H, are substantially identical to those of the management center CG shown in FIG. 2.

It is important to note that there is no one-to-one relationship between the number of carriers and the number of remote sites STi. On the other hand, there is necessarily a one-to-one relationship between a remote compressor of a remote site, and therefore a link, and a compressor of the hub H. Moreover, a compressor of the hub H feeds a plurality of links, and therefore a plurality of remote sites, and thus a plurality of decompressors (or expanders), at the rate of one decompressor per remote site, each decompressor restoring the same frame as the other decompressors operating on the same compressed frame.

The compressor/decompressor of the hub H and the control module 12, the distribution module 18 and the memory 19 of the traffic station STi may take the form of electronic circuits, software (or data processing) modules or a combination of circuits and software.

The invention may also take the form of a method of managing resources of a point-to-multipoint or multipoint-to-multipoint communications network.

That method consists in determining, firstly, for each traffic station, first information data representing rates of occupancy per traffic type of the resources previously assigned to its radio link, secondly, a primary distribution of resources between the radio links, including assignment margins, as a function at least of the rates of occupancy per traffic type, and, thirdly, a secondary distribution for each traffic station between its traffic types and the resources that have been assigned to its link as a result of the primary distribution, taking account of at least its rates of occupancy per traffic type.

The management method of the invention may have additional features, and in particular, separately and/or in combination:

- exchange of compressed frames via the satellite links;
- determination of the primary distribution on the basis not only of the first information data but also of second information data representing the assignment requirements of the traffic stations;
- determination of the primary distribution by the traffic management center of the communications network; in this case, the first information data may be determined either in the traffic management center or in the traffic stations (in which case it is sent to the traffic management center via the radio links);
- determination of the second information data in the traffic stations as a function of the traffic that they must send over their respective satellite links, in order to communicate that data to the traffic management center via the radio links; in this case, the second information data may be communicated via a dedicated signaling channel of the radio link or by integrating it into the frames sent; this second information data may take the form of binary indicators representing link saturation states, for example;
- determination of each secondary distribution at each of the traffic stations;
- selection of traffic types from a group including compression signaling traffic, network signaling traffic, voice traffic and data traffic;
- a secondary distribution determined as a function of defined relative priority levels of the various traffic types; in this case, compression signaling traffic preferably has the highest priority level, followed by network signaling traffic, voice traffic and finally data traffic; in the event of saturation of the resources of a link assigned to voice traffic despite a secondary distribution, resources previously assigned to data traffic may be assigned to voice traffic on this link, with the data of the data traffic that is not sent during the saturation period stored in a buffer, provided that this period does not exceed a selected threshold; in the event of persistence of voice traffic saturation, calls in progress can be continued and the initialization of new calls on the link concerned suspended; if that is still insufficient, voice traffic may be temporarily assigned resources that are reserved for "silence mode" traffic, with initialization of new calls on the link concerned still suspended;
- determination of the primary distribution based on a static traffic evolution model;
- storage of determined rates of occupancy per traffic type for each traffic station, followed by determination (preferably by extrapolation) of the resources that each traffic station requires for each of its traffic types, as a function of its determined rates of occupancy per traffic type, followed by determination of assignment margins for the extrapolated resources associated with each traffic type as a function of stored traffic evolution data specific to each traffic station and the determined rates of occupancy of all the traffic stations, followed finally by addition of the determined assignment margins to the extrapolated resources; in this case, the traffic evolution data preferably represents the difference between the extrapolated resources previously determined, excluding the margin, and the resources actually being used, obtained from the rates of occupancy that have just been determined; histograms may then be generated from the traffic evolution data representing the variation in time of each traffic type for each satellite link, for example, followed by determining a blocking rate for each radio link from each histogram, a function of the assignment margin allocated, followed by determining a blocking rate for each radio link for each rate of occupancy determined for each type of traffic and for each margin value starting from a null value, so as to determine the number of margin channels to assign to each radio link, allowing for its determined rates of occupancy, and finally sorting by increasing blocking rate, lumping all links together, to guarantee the lowest blocking rate for each of the radio links taking account of the total available assignment margin;

a primary distribution established periodically, in which case the secondary distributions are preferably established periodically, after establishing a primary distribution;

a primary distribution established for traffic to be sent (known as "forward traffic") and for traffic to be received (known as "return traffic").

The invention is not limited to the hub, management center and traffic station embodiments described hereinabove by way of example only, and encompasses all variants that the person skilled in the art might envisage that fall within the scope of the following claims.

Thus the invention has been described in a TDMA transmission application, but applies equally to SCPC, FDMA and CDMA transmission, and even to any other type of transmission based on dynamic sharing of transmission resources.

Moreover, the invention applies to compression/decompression equipment operating on signals before compression carried by frames or packets or by circuits.

The invention claimed is:

1. A method of managing resources in a point-to-multipoint or multipoint-to-multipoint communications network in which radio links sharing resources have been set up between remote traffic stations and a management center, comprising:

determining for each traffic station first information data representing rates of occupancy per traffic type of the resources previously assigned to its radio link, determining at least as a function of said rates of occupancy per traffic type a primary distribution of said resources between the radio links, including assignment margins, and determining for each traffic station a secondary distribution between traffic types of the resources assigned to its radio link as a result of the primary distribution, taking account of its rates of occupancy per traffic type.

2. A traffic management center for a point-to-multipoint or multipoint-to-multipoint communications network including remote traffic stations connected to said management center by radio links sharing resources, comprising:

management means for determining a primary distribution of said resources, including assignment margins, between the radio links that they manage and that have previously been set up between traffic stations at least as a function of first information data representing rates of occupancy per traffic type of resources previously assigned to said radio links so that each traffic station is able to determine a secondary distribution between traffic types of resources assigned to its radio link as a result of said primary distribution, taking account of its own rates of occupancy per traffic type.

3. A management center according to claim 2, further comprising:

compression and decompression means connected to said management means for compressing frames to be sent to said remote traffic stations via said radio links and decompressing compressed frames coming from said remote traffic stations via said radio links.

4. A management center according to claim 2, wherein said management means determine said primary distribution from said first information data and from second information data representing the assignment requirements of said traffic stations.

5. A management center according to claim 3, wherein said compression and decompression means determine said first information data from information contained in said received compressed frames.

6. A management center according to claim 5, wherein said first information data is contained directly in said received compressed frames.

7. A management center according to claim 4, wherein said compression and decompression means extract said second information data from frames sent by said traffic stations, a function of the traffic that they have to send via the corresponding radio link.

8. A management center according to claim 7, wherein said second information data is integrated into dedicated frames and sent via a dedicated signaling channel of the corresponding radio link.

9. A management center according to claim 7, wherein said second information data is integrated into the traffic frames sent.

10. A management center according to claim 4, wherein said second data takes the form of a binary indicator representing a state of saturation.

11. A management center according to claim 3, wherein said traffic types are selected from a group including compression signaling traffic, network signaling traffic, voice traffic and data traffic.

12. A management center according to claim 2, wherein said management means comprise secondary distribution means that determine said secondary distribution as a function of defined levels of relative priority of said traffic types.

13. A management center according to claim 11, wherein said management means comprise secondary distribution means that determine said secondary distribution as a function of defined levels of relative priority of said traffic types, and further characterized in that compression signaling traffic has the highest priority level, network signaling traffic has the next lower priority level, voice traffic has the next lower priority level and data traffic has the lowest priority level.

14. A management center according to claim 12, wherein, in the event of saturation of resources on their radio link assigned to voice traffic, said secondary distribution means assign to said voice traffic resources previously assigned to data traffic, said compression and decompression means then storing the data of the data traffic of their radio link in a first buffer during the period of saturation and deleting the stored data if said period exceeds a selected threshold.

15. A management center according to claim 14, wherein, in the event of persistence of voice traffic saturation, said secondary distribution means authorize calls in progress to continue and prohibit the initialization of new calls.

16. A management center according to claim 15, wherein, in the event of persistence of voice traffic saturation for calls in progress, said secondary distribution means assign temporarily to said voice traffic of a radio link resources reserved for "silence mode" traffic of that link and prohibit the initialization of new calls.

17. A management center according to claim 2, wherein said management means determine said primary distribution from a static traffic evolution model.

18. A management center according to claim 2, wherein said management means comprise primary distribution means that
- store the rates of occupancy per traffic type determined for each traffic station,
- determine by extrapolation for each traffic station the resources it requires for each of its traffic types as a function of its determined rates of occupancy per traffic type,
- determine assignment margins for the extrapolated resources associated with each traffic type as a function of stored traffic evolution data specific to each traffic station and the determined rates of occupancy of all the traffic stations, and
- add said determined assignment margins to said extrapolated resources to provide said primary distribution.

19. A management center according to claim 18, wherein said primary distribution means determine traffic evolution data representing the difference between the extrapolated resources previously determined, excluding the margin, and the resources actually being used, obtained from the rates of occupancy that have just been determined.

20. A management center according to claim 19, wherein said primary distribution means
- generate from said traffic evolution data histograms representing the temporal variation of each traffic type for each radio link,
- determine from each histogram a blocking rate for each radio link, a function of the assignment margin allocated,
- determine for each radio link a blocking rate for each rate of occupancy determined for each type of traffic and for each margin value starting from a null value, in order to determine the number of margin channels to be assigned to each radio link taking account of its (current) determined rates of occupancy, and
- carry out a sort by increasing blocking level, with all radio links lumped together, to guarantee the lowest blocking rate for each of the radio links taking account of the total available assignment margin.

21. A management center according to claim 2, wherein said management means establish said primary distribution periodically and said secondary distribution means establish said secondary distribution periodically after a primary distribution has been established.

22. A management center according to claim 2, wherein said management means establish said primary distribution for traffic to be sent and for traffic to be received.

23. A traffic station for a point-to-multipoint or multipoint-to-multipoint communications network, comprising:
- secondary distribution means that determine at least as a function of its rates of occupancy per traffic type a secondary distribution between its traffic types of resources assigned to its radio link by a traffic management center according to claim 2.

24. A traffic station according to claim 23, further comprising:
- compression and decompression means connected to said secondary distribution means to compress frames to be sent to the management center via the radio link and to decompress compressed frames coming said management center via said radio link.

25. A traffic station according to claim 23, further comprising:
- control means for determining first information data representing rates of occupancy per traffic type of resources previously assigned to the radio link by said management center and for instructing the sending of said first information data to said traffic management center via said radio link.

26. A traffic station according to claim 25, wherein said control means determine second information data representing its resource assignment requirements as a function of the traffic to be sent to said management center via said radio link and instruct the sending thereof to said traffic management center via said radio link with a view to determining the primary distribution.

27. A traffic station according to claim 26, wherein the traffic station sends said second information data via a dedicated signaling channel of its radio link.

28. A traffic station according to claim 26, wherein the traffic station integrates said second information data into frames sent to said traffic management center.

29. A traffic station according to claim 26, wherein said control means determine second information data in the form of binary indicators representing saturation states.

30. A traffic station according to claim 24, wherein said traffic types are selected from a group including compression signaling traffic, network signaling traffic, voice traffic and data traffic.

31. A traffic station according to claim 23, wherein said secondary distribution means determine said secondary distribution as a function of defined relative priority levels of said traffic types.

32. A traffic station according to claim 30, wherein said secondary distribution means determine said secondary distribution as a function of defined relative priority levels of said traffic types, and further characterized in that compression signaling traffic has the highest priority level, network signaling traffic has the next lower priority level, voice traffic has the next lower priority level and data traffic has the lowest priority level.

33. A traffic station according to claim 31, wherein, in the event of saturation of the resources assigned to voice traffic, said secondary distribution means assign to said voice traffic resources previously assigned to data traffic and then instruct said compression and decompression means to store in a first buffer the data of the data traffic for the period of saturation and to delete said stored data if said period exceeds a selected threshold.

34. A traffic station according to claim 33, wherein, in the event of persistence of voice traffic saturation, said secondary distribution means authorize calls in progress to continue and prohibit the initialization of new calls.

35. A traffic station according to claim 34, wherein, in the event of persistence of voice traffic saturation for calls in progress, said secondary distribution means temporarily assign said voice traffic resources reserved for "silence mode" traffic and prohibit the initialization of new calls.

36. A traffic station according to claim 23, wherein said secondary distribution means establish said secondary distribution periodically, after the establishing of a primary distribution.

37. The method claim 1 wherein said network is selected from a group including satellite communications networks and terrestrial radio communications networks with or without satellite extension.

38. The method according to claim 37, wherein said terrestrial radio communications networks with satellite extension are TDMA or CDMA cellular networks.

39. The management center according to claim 2 wherein said network is selected from a group including satellite communications networks and terrestrial radio communications networks with or without satellite extension.

40. The traffic station according to claim 23 wherein said network is selected from a group including satellite communications networks and terrestrial radio communications networks with or without satellite extension.

41. The management center according to claim 39, wherein said terrestrial radio communications networks with satellite extension are TDMA or CDMA cellular networks.

42. The traffic station according to claim 40, wherein said terrestrial radio communications networks with satellite extension are TDMA or CDMA cellular networks.

* * * * *